Patented Aug. 14, 1951

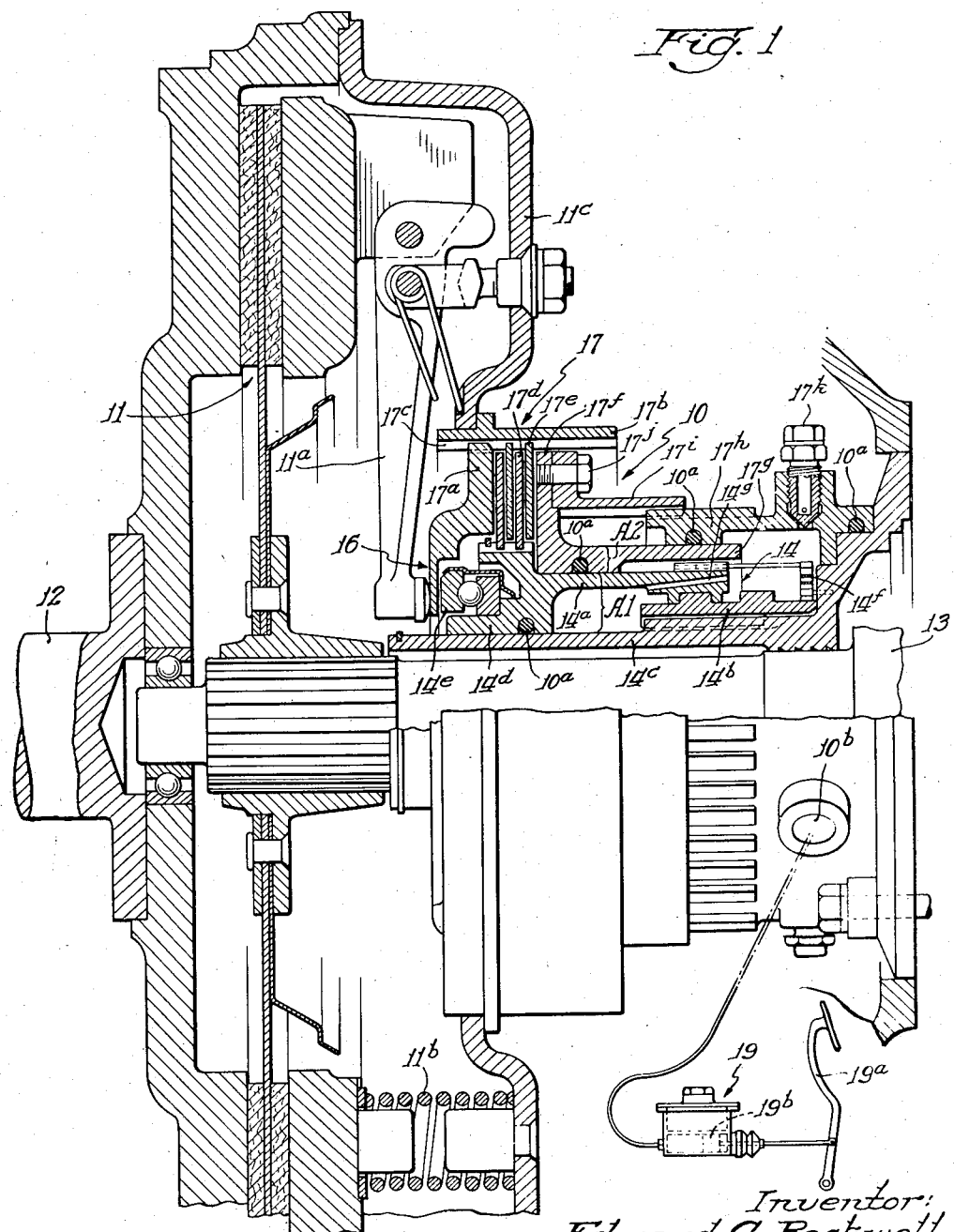

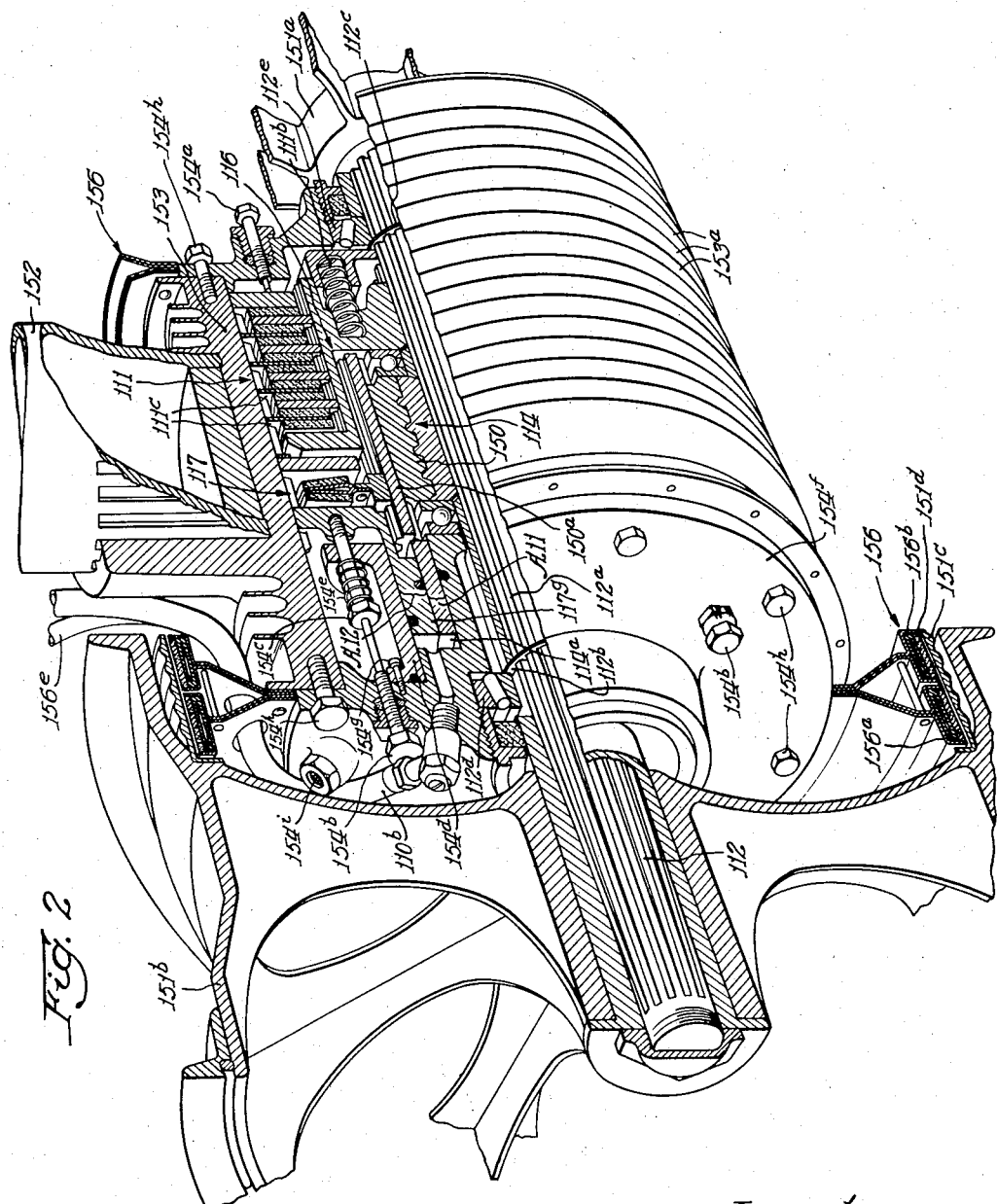

2,564,281

UNITED STATES PATENT OFFICE 2,564,281

SERVO POWER ACTUATOR

Edward A. Rockwell, Cleveland, Ohio

Application May 30, 1945, Serial No. 596,766

20 Claims. (Cl. 192—35)

This invention relates to servo actuators for applying power to any desired device, as for instance by converting power in a rotating shaft to linear power.

It is an object of my invention to provide an improved actuator arrangement effective in response to the delivery of a relatively low range of input control fluid pressures to develop a range of forces from a rotating power shaft, the value of which range of forces is relatively large as compared to the range of forces required to generate said control fluid pressures.

It is a more particular object to provide, in an arrangement of the above character including cooperating worm elements for converting the power of a rotating shaft to linear power movement and a friction control clutch for effecting the operation of said worm elements, means having a plurality of control pressure-fluid responsive srfaces of selected effective areas, a first one of said surfaces transmitting a first relatively low range of power directed to the output of said actuator and the other surface transmitting a second correspondingly low range of forces to said control friction clutch and thence through said control clutch to said actuator output, said control clutch being effective to cause the operation of said worm elements to develop a third relatively high range of component forces and deliver the same to said actuator output jointly with said first and second ranges of forces. A further object is to provide an inboard brake which is fully enclosed and which may have an enclosure which can support the wheel controlled by the brake and which may also be coupled with an outboard brake for the wheel.

Another object is to provide means for effectively dissipating the large amount of heat that may be produced in controlling the speed of the wheels having an enclosing casing for the braking means and clutch for operating the same. This is accomplished by using preferably cotton-faced friction surfaces submerged in oil.

The above and other objects and advantages of my invention will become apparent from the following detailed description thereof taken in connection with the accompanying drawings which form a part thereof and wherein:

Fig. 1 is a broken away schematic layout view partially in vertical section, illustrating an embodiment of my invention as applied to the actuation of a clutch; and Fig. 2 is a view similar to that of Fig. 1, showing the invention in perspective as applied to an air craft wheel brake.

Referring first to Fig. 1, the servo power actuator 10 is illustrated in a form and arrangement suitable for operating a standard friction clutch 11 which may be either of the automotive or of other industrial type. In the case of an automotive clutch for an automobile, an input power shaft 12 is driven by an internal combustion engine (not shown) while a shaft 13 driven thereby is connected with the ground engaging wheels through the usual transmission (not shown).

The servo power actuator 10 comprises generally a worm unit 14 effective to convert power from the rotatable shaft 13 to a linear power thrust and deliver this power to an actuator output thrust member 16, in turn adapted in the present modification to operate a plurality of clutch releasing levers 11a, the clutch being normally moved to engaged position by springs 11b arranged in the usual manner on a clutch cover plate 11c on which the levers 11a are pivotally supported, only one of said springs 11b being shown, for simplicity. A control friction clutch unit 17 is provided to control the energization of the worm unit 14 and said clutch unit 17 is also effective to transmit a second linear thrust force to the actuator output thrust member 16, so as to move the levers 11a against the force of the spring 11b to release the friction clutch 11, this second thrust force being directly proportional to the force which is applied to the control clutch unit 17 for engaging the same. More specifically, a back plate 17a rests against the levers 11a and is keyed to the inside of a tubular sleeve 17b by splines 17c allowing for the axial reciprocation of the back plate 17a but compelling the rotation of the back plate 17a with the rotation of the clutch housing 11c to which the sleeve 17b is fastened, as by welding. The back plate 17a being integral with the output thrust member 16, the operating force applied to the control clutch 17 is consequently transmitted to the actuator output member 16.

A plurality of sets of alternating control friction clutch plates 17d, 17e are, respectively, keyed to the sleeve 17b and to a worm member 14a. Furthermore, a control pressure plate 17f is provided with a pressure fluid responsive operating motive piston 17g, around the worm member 14a, to apply engaging pressure to the friction discs 17d, 17e, back plate 17a and thence to the actuator output thrust member 16. A telescoping stationary tubular member 17h is externally splined for cooperation with complementary internal splines on an axial extension 17i secured to the pressure plate 17f by screws 17j. The tubular member 17h also has an air bleeder screw 17k.

The worm unit 14 comprises an example of a mechanical servo mechanism as it includes two relatively movable members, that is to say the aforementioned internally threaded tubular worm element 14a cooperating with a complementary externally threaded tubular worm element 14b in turn carried in splined or keyed relation to a stationary supporting tubular housing member 14c around the shaft 13, which is free to turn therein. A sealing ring 10a is provided inside the tubular housing member 17h. The tubular worm element 14a is formed with a piston-like terminal portion 14d carrying thereon an anti-friction thrust ball bearing 14e engageable with the actuator thrust output member 16. By unwinding, a clock-like spring 14f, connected by its inner end to the worm element 14b and by its outer end to the worm element 14a, returns the worm element 14a to its initial position from the extended position thereof. Also, the worm element 14a has a plurality of transverse passageways 14g.

Control pressure fluid, as for instance under manual pressure, is admitted through a port 10b to the tubular member 17h and acts on the effective piston area A1 of the worm element 14a, and in addition this control pressure fluid acts on effective piston area A2 of the clutch control fluid responsive piston 17g.

The control pressure fluid may be generated by a manually operated master cylinder unit 19 of the usual type, having a foot pedal 19a and a piston 19b.

In the operation of my invention in Fig. 1, with the shaft 12 being rotated by the automobile engine, the sleeve 17b will rotate the control back plate 17a and the friction discs 17e. The control discs 17d, located adjacent the discs 17e, remain stationary. Subsequent operation of the pedal 19a and the master cylinder 19b will deliver the control pressure fluid through the port 10b into contact with the effective piston areas A1 and A2. The delivery of pressure fluid to the area A1 produces axial movement of the worm elements 14a and 14b without producing relative turning movement therebetween, thus bringing the thrust bearing 14e into engagement with the rear of the actuator thrust output member 16. This is effective to deliver initially a relatively low range of forces to the thrust output member 16, independently of any action of the worm threads on the elements 14a and 14b, by reason of the splined relation between the worm element 14b and the fixed tubular support 14c. Simultaneously the pressure fluid acts on the effective piston area A2 of the piston 17g, thus causing engagement of the friction discs 17e, 17d between the pressure plate 17f and the back plate 17a. This has the following results—a delivery of a second force directly to the actuator thrust output member 16 through the axially slidable control back plate 17a independently of the anti-friction bearing 14e, and, finally, this turns the worm element 14a relative to the worm element 14b, causing a separating movement therebetween to produce the said secondary force. The right hand terminal portion of the worm element 14b is driven into engagement with the face of the tubular support 14c and further rotation of the worm element 14a by the clutch discs 17d, 17e results in applying a third component of linear force to the actuator thrust output member 16 due to the action of the worm elements 14a, 14b. This third component of linear force will have a range of values proportional to but larger than the range of values of the forces applied to control pedal 19a. In other words, the range of forces generating the pressure in the control pressure fluid introduced through the port 10b will always be proportional to but considerably smaller in value than the range of the forces making up this third component of linear forces generated or developed by the worm elements from the rotating shaft 12.

It will be noted that the power delivered to the actuator thrust output member 16 has two separate paths. The first path is through the control clutch including the back plate 17a. The second path is through the worm member 14a. Of considerable importance is the further fact that the transmission of power through the second path is completely dependent upon the continued transmission of power through the first independent path, including dependence upon the "follow through" of pressure fluid action on the effective area A2. Any momentary relaxation of control pressure fluid delivered to the effective area A—2 immediately has the effect of releasing the clutch discs 17d, 17e, and in view of the location of the anti-thrust bearing 14e all turning torque on worm element 14a is lost. Relaxation of control pressure fluid action not only releases the friction discs 17e, 17d but in addition eliminates the above referred to first and second ranges of forces transmitted to the actuator output member 16 through the back plate 17a and through the piston element 14a by control pressure fluid action on areas A1, A2. This arrangement insures against any tendency on the part of the worm elements 14a and 14b to continue their operation following relaxation of the control pressure, which represents the major weakness in the previously available worm-type servo mechanisms.

The "follow-up" on the effective areas A1, A2 and the reaction therefrom gives the operator a sensitive "feel" as to the operating position of the actuator output thrust member 16 and hence of the clutch 11 operated thereby. This will be equally true of any other device that the present actuator arrangement may be employed to operate.

Turning now to Fig. 2, I have illustrated therein an application of the present invention to the operation of an aircraft wheel brake unit. A multiple oil-submerged woven cotton or other fabric faced brake friction plate assembly 111 is enclosed within the housing which contains oil for lubricating and cooling, this brake assembly corresponding to and replacing the clutch 11 of Fig. 1. A slightly modified worm unit 114 cooperating with a worm 150 acts to convert the rotary movement of a wheel supporting shaft 112 to linear thrust and transmit the same to an annular actuator output member 116 in a manner similar to the cooperation between the worm unit 14 and the output member 16 of the embodiment shown in Fig. 1. An oil-submerged woven cotton or other fabric faced friction control clutch plate unit 117 splined on the thrust member 150a of a slightly different construction performs the same function as the friction discs 17e, 17d of the previous embodiment. Telescoping thrust members 114a, 117g, having effective pressure fluid responsive areas A—11, A—12, likewise correspond to elements 14a and 17g, having effective pressure responsive areas A1, A2. A coil compression spring 111b urges the brake assembly 111 in the off direction. An inlet connection 110b receives control pressure fluid from the pilot actuated brake pedal (not shown) in very much the same manner as described in the above embodiment. This control pressure fluid acts on the effective areas A—11 and A—12 to deliver an initial linear thrust through the thrust member 150a, splined to the worm 150, to the brake assembly 111. This control pressure fluid similarly acts on the effective area A—12 of the second thrust member 117g which in turn acts through the clutch plate unit 117 to transmit a second linear force to the actuator output member 116 and thence to the brake assembly 111, thus providing a second path of actuating power flow to the brakes. A third range of linear power forces is generated by the action of the worm gear unit 114 which is energized so as to move the worm 150 relatively to the worm unit 114 by the control clutch 117 being brought into action by the movement of the second thrust member 117g, which third range of forces is transmitted to the output member 116 and thence to the brake assembly 111.

In this second embodiment, a shaft 112, having splines 112a with split rings 112b and 112c for positioning roller bearings 112d and 112e, is the supporting shaft for a pair of aircraft wheels 151a, 151b, the rotation of which, by contact with the ground, furnishing the power input to the shaft 112 which is converted by the worm unit 114 into brake applying power. The complete unit is supported on a strut 152 of the usual kind, arranged to be raised and lowered at will, and is contained in a transversely extending cylindrical housing 153 provided with fins 153a for improving the heat removal characteristics.

A plurality of clearance adjusting stop screws 154a and 154b are provided in each of the respective end portions of the housing 153. The adjusting stop screws 154b contact with screws 154c, carried by the element 117g and slidably carried in a sleeve 154d supporting helical springs 154e. The sleeve 154d is tightly fastened to a head 154f by screws 154g and the head 154f is secured by the screws 154h to the cylindrical housing 153. A screened air vent 154i passes through the head 154f.

In view of the large amount of energy that is required to be dissipated in a brake installation of this type, I prefer that the brake assembly proper 111 take the form of a plurality of metal discs 111c having their radial outer extremities splined to the fixed housing and carrying cotton facings radially inwardly of these splined portions.

The control clutch 117, preferably, is in the form of the usual single disc automotive clutch having a splined hub and carrying suitable friction facings with a resilient support therebetween.

To facilitate the transmission of the axial thrust from the piston 114a to the actuator output member 116 there is provided an internally and externally splined thrust member 150a the externally splined portion of which cooperates with the splined hub of the control clutch 117 and the internally splined portion of which cooperates with a complementarily splined portion of the outside worm element 150.

From the above it will be seen that the present actuator arrangement may be employed, for example, wherever it is desired to convert the power in a rotary shaft to a linear power force, and particularly where it is important to control very closely the range of power so converted, as by means of a manually operated control element.

Earlier forms of my mechanical servo mechanisms for operating automobile brakes by means of reversible worms, are contained in the patents to Rockwell, No. 1,859,530, May 24, 1932, upon Vehicle Brake, and Rockwell et al., No. 1,896,377, February 7, 1933, upon Power Brake Unit.

In addition to the above brake arrangement 111, I have provided an emergency or auxiliary brake of the expander tube type indicated generally at 156 and comprising a pair of the usual expander tubes 156a, 156b cooperating with an internal drum 151c by means of intervening blocks 151d, and which may be expanded in the usual way by receiving hydraulic liquid from a control pipe 156e on the strut 152, which also carries the inlet connection 110b. The pipe 156e leads to a pilot actuated brake pedal (not shown).

While I have disclosed by invention in connection with certain specific embodiments thereof, it will be understood that this is merely by way of example rather than in limitation thereof, and that the same is to be defined by the appended claims. For instance, by way of example, the device, the movement of which is to be controlled, refers to the shaft 13 or the wheel 151b or shaft 112, the element moved by a source of energy refers to the lever 11a or disc brake 111, the friction clutching mechanism refers to the friction clutch 17 or 117, the first member refers to the tubular element 14a or 114a, the second member refers to 17g or 117g, and the servo mechanism refers to 14 or 114, although other parts comparable thereto can be used instead.

I claim:

1. In a linear servo actuator arrangement for converting the rotary motion of a driven shaft to linear motion including, a linear thrust output member, telescoping worm elements between said shaft and said actuator output member for converting rotary motion of said shaft to linear motion of said thrust output member through a first power path, a control friction disc clutch assembly for energizing said worm elements, said clutch control arrangement including an axially movable back plate, means connecting said back plate in force transmitting relation to said thrust output member by a second path so as to apply another force other than through said worm elements, means associated with said control clutch defining a first fluid pressure responsive area and manually operable fluid pressure generating means reactive to the transmitted force for delivering fluid pressure to said pressure responsive area and effecting the operation of said control clutch.

2. In a linear servo actuator arrangement for converting power from a rotary shaft to a linear thrust output member, telescoping worm elements between said shaft and said output member for converting rotary motion of said shaft to linear motion of said thrust output member defining a first power path, a control friction disc clutch assembly for energizing said worm elements, said assembly including an axially movable back plate, means connecting said back plate in linear force transmitting force to said thrust output member defining a second power path so as to apply another force other than through said worm elements, a pressure plate, means defining a piston-like fluid pressure responsive member for operating said pressure plate, means associated with one of said worm elements defining a second piston-like member responsive to fluid pressure for moving one of said worm elements axially into thrust relation with said output member and manually operable fluid pressure generating means reactive to the transmitted force for delivering fluid pressure to both of said piston-like members.

3. In an arrangement for applying power to a reciprocable thrust output member from a rotating power shaft, means including a plurality of telescoping complementary threaded worm elements, clutch means for selectively connecting one of said telescoping elements in driving relation to the power shaft to be driven from said power shaft, means preventing rotation of the other of said telescoping elements thereby effecting relative axial movement between said telescoping element so as to be transformed into relative motion around said axis when said clutch is engaged, said clutch including an axially adjustable back plate, means for connecting said back plate in thrust transmitting relation with said output member, fluid pressure responsive means for applying a first range of axial control forces to said threaded telescoping members and transmitting the same directly to said output member, additional fluid pressure responsive means for applying a separate range of control forces to said clutch effective to cause said other telescoping member to turn and be forced to move axially relative to the other one of said telescoping members to thus apply a second range of forces to said output member, said clutch back plate applying forces being so correlated with said first range of forces and said range of forces transmitted by said telescoping members that the same have a definite ratio to each other.

4. In a linear servo actuator arrangement for converting rotary motion of a power shaft to linear motion of an output thrust member including, an internally splined externally threaded worm element, a second internally threaded worm element embracing said first element, a control friction disc clutch unit for energizing said worm elements, said clutch unit including an axially movable back plate, means connecting said back plate in force transmitting relation to said thrust output member, a tubular piston-like member embracing said internally threaded worm, said piston-like member defining a piston-like pressure responsive surface effective to move said worm into power transmitting relation with said output member and said piston-like member being responsive to the same fluid pressure for operating said clutch to energize said worm elements, and means for generating control fluid pressure and delivering the same to said pressure responsive elements.

5. In combination, a device the movement of which is to be controlled, an element moved by a source of energy, a friction clutching mechanism connected to affect the movement of said device by said element and adapted to be energized by the source of energy which moves said element, and means for controlling the movement of said device with the aid of the friction clutching mechanism comprising, a member constructed to apply a force to said element, a second member having a movement apart from the movement of the first member, constructed to apply another force to move said element, and a mechanical servo mechanism energized by said source of energy and arranged to apply a third force by means of said friction clutching mechanism to said element.

6. In combination, a device the movement of which is to be controlled, an element moved by a source of energy, a friction clutching mechanism connected to affect the movement of said device by said element and adapted to be energized by the source of energy which moves said element, and means for controlling the movement of said device with the aid of the friction clutching mechanism comprising, a member constructed to apply a force through said friction clutching mechanism to said element, a second member having a movement apart from the movement of the first member, constructed to apply another force to move said element, and a mechanical servo mechanism energized by said source of energy and arranged to apply a third force by means of said friction clutching mechanism to said element.

7. In combination, a device the movement of which is to be controlled, an element moved by a source of energy, a friction clutching mechanism connected to affect the movement of said device by said element and adapted to be energized by the source of energy which moves said element, and means for controlling the movement of said device with the aid of the friction clutching mechanism comprising, a member constructed to apply a force to said element directly, not through said friction clutching mechanism, a second member having a movement apart from the movement of the first member, constructed to apply another force to move said element, and a mechanical servo mechanism energized by said source of energy and arranged to apply a third force by means of said friction clutching mechanism to said element.

8. In combination, an automotive driving accessory the movement of which is to be controlled, an element moved by a source of energy, a friction clutching mechanism connected to affect the movement of said accessory and adapted to be energized from said element, and means for controlling the movement of said accessory with the aid of the friction clutching mechanism comprising, a member constructed to apply a force to said element, a second member having a movement apart from the movement of the first member, constructed to apply another force to move said element, and a mechanical servo mechanism energized by said source of energy and arranged to apply a third force by means of said friction cltuching mechanism to said element.

9. In combination, an automotive driving accessory the movement of which is to be controlled, an element moved by a source of energy, a friction clutching mechanism connected to affect the movement of said accessory and adapted to be energized from said element, and means for controlling the movement of said accessory with the aid of the friction clutching mechanism comprising, a member constructed to apply a force through said friction clutching mechanism to said element, a second member having a movement apart from the movement of the first member, constructed to apply another force to move said element, and a mechanical servo mechanism energized by said source of energy and arranged to apply a third force by means of said friction clutching mechanism to said element.

10. In combination, an automotive driving accessory the movement of which is to be controlled, an element moved by a source of energy, a friction clutching mechanism connected to affect the movement of said accessory and adapted to be energized from said element, and means for controlling the movement of said accessory with the aid of the friction clutching mechanism comprising, a member constructed to apply a force to said element directly, not through said friction clutching mechanism, a second member having a movement apart from the movement of the first member, constructed to apply another force to move said element, and a mechanical servo mechanism energized by said source of energy and arranged to apply a third force by means of said friction clutching mechanism to said element.

11. In combination, a vehicle-supporting wheel the movement of which is to be controlled, an axle on which the wheel is fastened and a casing around said axle enclosing the following therein, an element moved by a source of energy by the movement of said wheel, a friction clutching mechanism connected to affect the movement of said wheel and adapted to be energized from said element, and means for controlling the movement of said wheel with the aid of the friction clutching mechanism comprising, a member constructed to apply a force to said element, a second member having a movement apart from the movement of the first member, constructed to apply another force to move said element, and a mechanical servo mechanism energized by said element, controlled by said first mentioned means, and arranged to apply a third force by means of said friction clutching mechanism to said element.

12. In combination, a vehicle-supporting wheel the movement of which is to be controlled, an axle on which the wheel is fastened and a casing around said axle enclosing the following therein, an element moved by a source of energy by the movement of said wheel, a friction clutching mechanism connected to affect the movement of said wheel and adapted to be energized from said element, and means for controlling the movement of said wheel with the aid of the friction clutching mechanism comprising, a member constructed to apply a force through said friction clutching mechanism to said element, a second member having a movement apart from the movement of the first member, constructed to apply another force to move said element, and a mechanical servo mechanism energized by said element, controlled by said first mentioned means, and arranged to apply a third force by means of said friction clutching mechanism to said element.

13. In combination, a vehicle-supporting wheel the movement of which is to be controlled, adapted to be carried by an airplane strut, an axle on which the wheel is fastened, an element moved by a sourse of energy from the movement of said wheel, and an enclosure around said axle completely enclosing the following, a friction clutching mechanism connected to affect the movement of said wheel and adapted to be energized from said element, and means for controlling the movement of said wheel with the aid of the friction clutching mechanism comprising, a member constructed to apply a force to said element, a second member having a movement apart from the movement of the first member, constructed to apply another force to move said element, and a mechanical servo mechanism energized by said element, controlled by said first mentioned means, and arranged to apply a third force by means of said friction clutching mechanism to said element.

14. In combination, a vehicle-supporting wheel the movement of which is to be controlled, adapted to be carried by an airplane strut, an axle on which the wheel is fastened, an element moved by a source of energy from the movement of said wheel, and an enclosure around said axle completely enclosing the following, a friction clutching mechanism, connected to affect the movement of said wheel and adapted to be energized from said element, and means for controlling the movement of said wheel with the aid of the friction clutching mechanism comprising, a member constructed to apply a force through said friction clutching mechanism to said element, a second member having a movement apart from the movement of the first member, constructed to apply another force to move said element, and a mechanical servo mechanism energized by said element, controlled by said first mentioned means, and arranged to apply a third force by means of said friction clutching mechanism to said element.

15. In a compact servo actuator the combination of a device the movement of which is to be controlled, an element moved by a source of energy, a friction clutching mechanism mechanically connected to the device to affect the movement of said device and adapted to be energized by the source of energy which moves said element, and hydraulic means for controlling the movement of said device with the aid of the friction clutching mechanism comprising, a pedal, a connection therefrom including a hydraulic conduit, a member connected hydraulically to said conduit, having a mechanical connection, to apply a manual force to said element, and a mechanical servo mechanism energized by said source of energy having another different hydraulically actuated member connected to said conduit and arranged to apply another force mechanically by means of said friction clutching mechanism to said element.

16. In compact servo actuator the combination of a device the movement of which is to be controlled, an element moved by a source of energy, a friction clutching mechanism mechanically connected to the device to affect the movement of said device and adapted to be energized by the source of energy which moves said element, and hydraulic means for controlling the movement of said device with the aid of the friction clutching mechanism comprising, a pedal, a connection therefrom including a hydraulic conduit, a member connected hydraulically to said conduit, having a mechanical connection to apply a manual force to said element, and a mechanical servo mechanism, comprising reversible inclined surfaces, energized by said source of energy having another different hydraulically actuated member connected to said conduit and arranged to apply another force mechanically by means of said friction clutching mechanism to said element.

17. In a compact servo actuator the combination of a device the movement of which is to be controlled, an element moved by a source of energy, a friction clutching mechanism mechanically connected to the device to affect the movement of said device and adapted to be energized by the source of energy which moves said element, and hydraulic means for controlling the movement of said device with the aid of the friction clutching mechanism comprising, a pedal, a connection therefrom including a hydraulic conduit, a member connected hydraulically to said conduit, having a mechanical connection to apply a manual force to said element reactive according to the force applied thereto, and a mechanical servo mechanism energized by said source of energy having another different hydraulically actuated member connected to said conduit and arranged to apply another force mechanically by means of said friction clutching mechanism to said element.

18. In a servo actuator the combination of a device the movement of which is to be controlled, an element moved by a source of eenrgy, a friction clutching mechanism mechanically connected to the device to affect the movement of said device and adapted to be energized by the source of energy which moves said element, a hydraulic inlet for controlling the movement of said device with the aid of the friction clutching mechanism adapted to be connected to a pedal by a hydraulic conduit, a member connected hydraulically to said inlet, having a mechanical connection, to apply a manual force to said element, a mechanical servo mechanism energized by said source of energy and another different hydraulically actuated member connected to said inlet and arranged to apply another force mechanically by means of said friction clutching mechanism to said element.

19. In a servo actuator the combination of a device the movement of which is to be controlled, an element moved by a source of energy, a friction clutching mechanism mechanically connected to the device to affect the movement of said device and adapted to be energized by the source of energy which moves said element, a hydraulic inlet for controlling the movement of said device with the aid of the friction clutching mechanism adapted to be connected to a pedal by a hydraulic conduit, a member connected hydraulically to said inlet, having a mechanical connection to apply a manual force to said element, a mechanical servo mechanism, comprising reversible inclined surfaces, energized by said source of energy and another different hydraulically actuated member connected to said inlet and arranged to apply another firce mechanically by means of said friction clutching mechanism to said element.

20. In a servo actuator the combination of a device the movement of which is to be controlled, an element moved by a source of energy, a friction clutching mechanism mechanically connected to the device to affect the movement of said device and adapted to be energized by the source of energy which moves said element, a hydraulic inlet for controlling the movement of said device with the aid of the friction clutching mechanism adapted to be connected to a pedal by a hydraulic conduit, a member connected hydraulically to said inlet, having a mechanical connection to apply a manual force to said element reactive according to the force applied thereto, a mechanical servo mechanism energized by said source of energy and another different hydraulically actuated member connected to said inlet and arranged to apply another force mechanically by means of said friction clutching mechanism to said element.

EDWARD A. ROCKWELL.

REFERENCES CITED

The following references are of record in the file of this patent:

UNITED STATES PATENTS

| Number | Name | Date |
| --- | --- | --- |
| 848,380 | Lake | Mar. 26, 1907 |
| 1,896,377 | Rockwell et al. | Feb. 7, 1933 |
| 1,989,179 | Versluis | Jan. 29, 1935 |
| 2,008,967 | Rossman | July 23, 1935 |
| 2,029,637 | Rockwell | Feb. 4, 1936 |
| 2,085,607 | Rockwell | June 29, 1937 |
| 2,140,731 | Bendix | Dec. 20, 1938 |
| 2,203,296 | Fleischel | June 4, 1940 |